Sept. 13, 1966 C. A. SECKERSON 3,272,061
FASTENERS
Filed April 2, 1965

INVENTOR:
CLIFFORD ALEXANDER SECKERSON,
BY Philip E. Parker
ATTY.

United States Patent Office 3,272,061
Patented Sept. 13, 1966

3,272,061
FASTENERS
Clifford Alexander Seckerson, Iver Heath, England, assignor to United-Carr Incorporated, Boston, Mass., a corporation of Delaware
Filed Apr. 2, 1965, Ser. No. 445,108
Claims priority, application Great Britain, May 7, 1964, 19,067/64
4 Claims. (Cl. 85—82)

The present invention relates to an improved fastener which is particularly but not exclusively suitable for attaching an apertured panel to a support formed with a bore.

In the radio and television industry the design of cabinets is often such that the back-panel of the cabinet is bowed slightly when attached in place and is thus under permanent tension.

If in this situation, the back-panel is attached to the cabinet by a conventional snap-fastening it has been found that the permanent tension in the back-panel is often sufficient to work the snap-fastening loose so that the back panel comes away from the cabinet and it is an object of the present invention to provide a fastening which is both quick to apply and release and which avoids the danger of working loose under tension.

It is a further object of the invention to provide a fastener for attaching an apertured panel to a recessed support and comprising a stud and a socket, the socket comprising a tubular sleeve adapted for close-fitting insertion in the recessed support and, at one end of the sleeve a circumferential flange adapted to seat on the recessed support, the sleeve comprising an inner portion adjacent the flange, the internal cross-section of which is approximately circular and an outer portion the internal cross-section of which is approximately rectangular and includes two facing substantially flat walls, the stud having a head and a shank for insertion into the sleeve of the socket, the shank having an inner portion adjacent the head and adapted for rotation within the inner portion of the sleeve, two diametrically opposed lugs and a neck portion of reduced cross-section relative to the inner portion joining the lugs to the inner portion, the lugs being adapted to pass easily into the outer portion of the sleeve when the stud is in one angular position relative to the socket and being adapted to bite into the said walls of the outer portion of the sleeve and expand the said outer portion when the stud is rotated relative to the socket away from the said angular position.

A preferred form of the invention will now be described with reference to the accompanying diagrammatic drawings in which.

Figure 1:
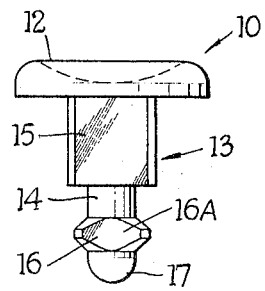
FIGURES 1 and 2 are respectively an elevation and underplan of a stud.
Figure 3:
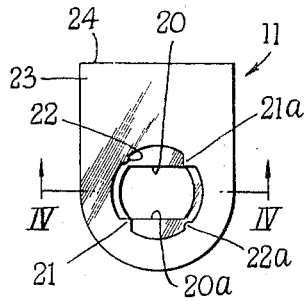
FIGURES 3 and 4 are respectively a plan view of a socket and a section on the line IV—IV of FIGURE 3.
Figure 2:
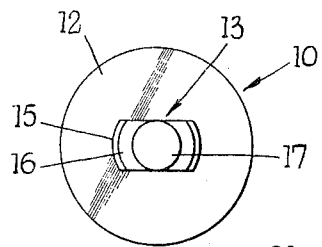
Figure 4:
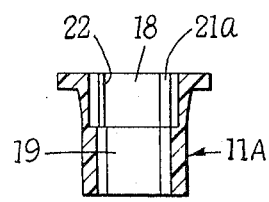

In FIGURES 1 to 4 a stud is indicated generally at 10 and a socket at 11. Both the stud and socket are formed from a synthetic plastics material and the stud is preferably formed from a harder, less resilient material than the socket.

The stud 10 comprises a button shaped head 12 and a shank 13 comprising a substantially flat inner portion 15, which is approximately rectangular in cross-section, and an outer portion comprising a tapered tip 17 and two outwardly extending lugs 16, 16a joined to the inner portion by a cylindrical neck 14.

The stud 10 is adapted for insertion into the socket 11 which comprises a tubular sleeve 11a and which has an inner bore 18 and outer bore 19.

The outer bore 19 is approximately rectangular in cross-section and has two lengthwise extending, parallel, flat walls 20, 20a.

The inner bore 18 is substantially cylindrical and is formed with two diagonally located abutments 21, 21a in the form of axially extending ribs and two diagonally located stops 22, 22a which are also in the form of axially extending ribs.

Figure 6:
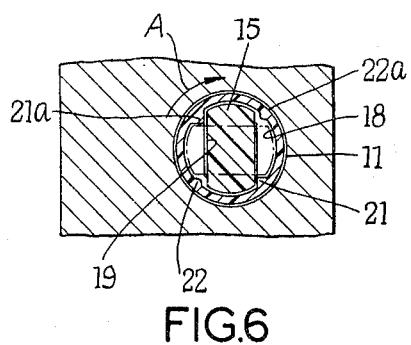
FIGURE 6 is a section on the line VI—VI of FIGURE 5.
Figure 7:
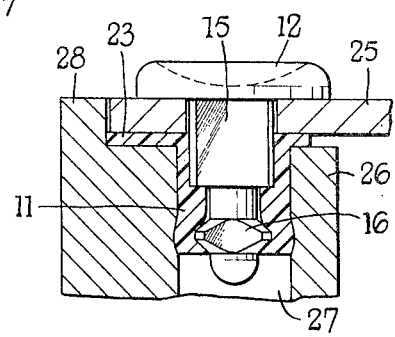
FIGURE 7 is an elevation similar to FIGURE 5 showing the stud and socket in the locked position.

As will be seen from FIGURE 6 the abutments 21, 21a extend radially further into the bore 18 than the stops 22, 22a.

A flange 23 is formed around the inner end of the sleeve 11a of the socket and the flange has a straight bearing edge 24.

In order to attach an apertured panel 25 to a support 26 formed with a bore 27 the socket 10 is inserted into the bore 27. Preferably the socket is a light friction fit in the bore and the support 26 is formed with a rib 28 against which the bearing edge 24 of the flange 23 engages to prevent rotation of the socket in the bore.

The stud 10 is passed through the apertured panel 25 and the shank 13 is inserted into the socket 11. The outer portion of the shank is a close fit in the outer bore 19 when the shank is aligned in one angular position relative to the socket 11 so that the stud is easily inserted into the position shown in FIGURE 5.

The stud 10 is then rotated through 90° in the direction of the arrow A of FIGURE 6. When this rotation is effected the inner portion 15 of the stud rotates into the position shown in broken line where it is held against further rotation by the ribs 21, 21a. At the same time the lugs 16, 16a of the outer portion being formed of a harder material than the socket bite into the flats 20, 20a so as to prevent the stud from being withdrawn and expand the socket wall outwardly into tight frictional engagement with the wall of the bore.

After rotation of the stud, the stud and socket are firmly secured to the support and can only be released by rotating the stud back through 90°. Accidental rotation of the stud back from the locked position is prevented by the stops 22, 22a, which project sufficiently to provide a positive location for the stud in the locked position.

In one application, which is given by way of example only, a number of the studs and sockets of the present invention may be used to attach a backboard to a radio or television cabinet.

Figure 5:
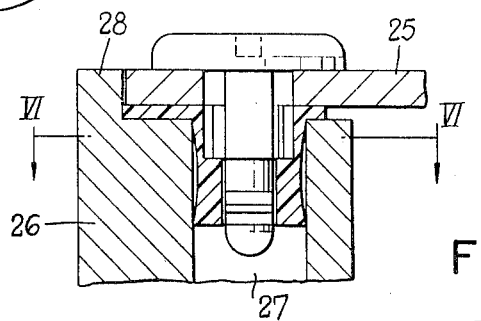
FIGURE 5 is a part-sectional elevation of the stud and socket holding a panel to a support.

In such an assembly the back panel and frame of the cabinet are formed with a number of corresponding apertures and bores and a socket is attached to each bore in the manner described with reference to FIGURE 5 with studs holding the panel to the cabinet and each socket in firm engagement in its bore in the cabinet.

Preferably the frame of the cabinet is formed with an outer rib similar to the rib 28 on the support 26 but this is not essential and a suitable key may be held against the flange of each socket to hold the socket when the stud is being rotated into the locked position.

The fastener of the present invention is particularly useful for attaching the backboard of a cabinet to the cabinet frame when the backboard is bowed slightly and held under permanent tension on the cabinet frame. The stud 10 of the fastener which bites into the socket 11 provides a positive hold on the socket which reduces any tendency for the fastener to work loose under a permanent stress.

What I claim is:

1. A fastener for attaching an apertured panel to a recessed support and comprising a stud and a socket, the socket comprising a tubular sleeve adapted for close-fitting insertion in the recessed support and, at one end of the sleeve a circumferential flange adapted to seat on the recessed support, the sleeve comprising an inner portion adjacent the flange, the internal cross-section of which is approximately circular and an outer portion the internal cross-section of which is approximately rectangular and includes two facing substantially flat walls, the stud having a head and a shank for insertion into the sleeve of the socket, the shank having an inner portion adjacent the head and adapted for rotation within the inner portion of the sleeve, two diametrically opposed lugs and a neck portion of reduced cross-section relative to the inner portion joining the lugs to the inner portion, the lugs being adapted to pass easily into the outer portion of the sleeve when the stud is in one angular position relative to the socket and being adapted to bite into the said walls of the outer portion of the sleeve and expand the said outer portion when the stud is rotated relative to the socket away from the said angular position.

2. A fastener as claimed in claim 1, in which the socket has a lengthwise extending rib on the internal wall of the inner portion of the sleeve adapted to limit rotation of the stud in the socket.

3. A fastener as claimed in claim 2 in which the socket has two diagonally located lengthwise extending ribs on the internal wall of the sleeve adapted to limit rotation of the stud in the socket to an angle of 90°.

4. A fastener as claimed in claim 3, in which the flange on the socket has a straight edge adapted for bearing engagement against a support to prevent rotation of the socket during rotation of the stud therein.

References Cited by the Examiner

UNITED STATES PATENTS

| 481,566 | 8/1892 | Hunter | 85—5 |
| 2,172,827 | 9/1939 | Becker | 85—5 |

FOREIGN PATENTS 582,504  11/1946  Great Britain.

CARL W. TOMLIN, *Primary Examiner.*

G. A. MILWICK, *Assistant Examiner.*